(12) United States Patent
Shawabkeh et al.

(10) Patent No.: US 9,737,872 B2
(45) Date of Patent: Aug. 22, 2017

(54) MODIFIED ACTIVATED CARBON PREPARATION AND METHODS THEREOF

(71) Applicant: King Fahd University of Petroleum and Minerals, Dhahran (SA)

(72) Inventors: Reyad Awwad Shawabkeh, Dhahran (SA); Ibnelwaleed Ali Hussein, Dhahran (SA); Hafiz Muhammad Zaheer Aslam, Al-khobar (SA); Nadhir H. Al-Baghli, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 202 days.

(21) Appl. No.: 14/920,290

(22) Filed: Oct. 22, 2015

(65) Prior Publication Data
US 2017/0113202 A1 Apr. 27, 2017

(51) Int. Cl.
*B01D 53/02* (2006.01)
*B01J 20/20* (2006.01)
*C01B 31/08* (2006.01)
*C01B 31/12* (2006.01)
(Continued)

(52) U.S. Cl.
CPC ............ *B01J 20/20* (2013.01); *B01D 53/02* (2013.01); *B01J 20/28059* (2013.01); *B01J 20/28061* (2013.01); *B01J 20/28071* (2013.01); *B01J 20/28073* (2013.01); *B01J 20/28083* (2013.01); *B01J 20/3071* (2013.01); *B01J 20/3078* (2013.01); *C01B 31/081* (2013.01);
(Continued)

(58) Field of Classification Search
CPC ........ B01D 2253/102; B01D 2257/304; B01D 53/02; B01J 20/20; B01J 20/28059; B01J 20/28061; B01J 20/28071; B01J 20/28073; B01J 20/28083; B01J 20/3071; B01J 20/3078; C01B 31/081; C01B 31/12
See application file for complete search history.

(56) References Cited

U.S. PATENT DOCUMENTS

| 2005/0196336 A1* | 9/2005 | Chatterjee | ................ B01J 20/02 423/448 |
| 2007/0179056 A1* | 8/2007 | Baek | ...................... B01D 53/02 502/400 |

(Continued)

FOREIGN PATENT DOCUMENTS

| CN | 103626174 A | 3/2014 |
| KR | 10-0996431 B1 | 11/2010 |

*Primary Examiner* — Christopher P Jones
(74) *Attorney, Agent, or Firm* — Oblon, McClelland, Maier & Neustadt, L.L.P.

(57) ABSTRACT

A process for making a modified, mesoporous activated carbon material from waste oil fly ash. The process involves a physicochemical treatment of a raw waste oil fly ash sample, where the sample is initially refluxed in an acid solution, then activated at about 1000° C. and in the presence of carbon dioxide. The activated carbon may be further functionalized with carboxylic and/or amine groups by refluxing the activated carbon in a second acid solution and/or an ammonia solution. The activated carbon, as prepared, has a BET surface area of 30-400 m$^2$/g, a total pore volume of 0.25-0.50 cm$^3$/g and an average pore size of 40-100 Å. A method for removing hydrogen sulfide from natural gas with the modified activated carbon is also provided.

20 Claims, 7 Drawing Sheets

(51) Int. Cl.
*B01J 20/30* (2006.01)
*B01J 20/28* (2006.01)

(52) U.S. Cl.
CPC ........ *C01B 31/12* (2013.01); *B01D 2253/102* (2013.01); *B01D 2257/304* (2013.01)

(56) References Cited

U.S. PATENT DOCUMENTS

| | | | |
|---|---|---|---|
| 2011/0197791 A1* | 8/2011 | Landreth | B01D 53/10 106/707 |
| 2014/0197020 A1 | 7/2014 | Xu | |
| 2014/0319062 A1* | 10/2014 | Banerjee | C01B 31/00 210/695 |

* cited by examiner

MODIFIED ACTIVATED CARBON PREPARATION AND METHODS THEREOF

BACKGROUND OF THE INVENTION

Technical Field

The present invention relates to a process for preparing activated carbon. More specifically, the present invention relates to a process for preparing modified, mesoporous activated carbon by physicochemical treatment of waste oil fly ash. The prepared activated carbon material is suitable for hydrogen sulfide gas removal applications.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Hydrogen sulfide ($H_2S$) is a major pollutant where the presence thereof in natural gas results in major corrosion and environmental problems. Hydrogen sulfide is toxic and is a most harmful toxin gas for human and animals. It becomes fatal when its concentration exceeds 500 ppm [Y. Elsayed, M. Seredych, A. Dallas, T. J. Bandosz, Desulfurization of air at high and low $H_2S$ concentrations, Chem. Eng. J. 155 (2009) 594-602; P. Forzatti, L. Lietti, Catalyst deactivation, 52 (1999) 165-181; W. J. Powers-Schilling, Olfaction: Chemical and psychological consideration, in: Nuisance Concern Animal. Management: Odor and Flies, Gainesville, Fla., 1995; Y. Xiao, S. Wang, D. Wu, Q. Yuan, Catalytic oxidation of hydrogen sulfide over unmodified and impregnated activated carbon, Sep. Purif. Technol. 59 (2008) 326-332—each incorporated herein by reference in its entirety]. On the other hand, the presence of $H_2S$ at concentrations higher than 5.5 $mg/m^3$ in natural gas leads to sulfur stress cracking that reduces life of processing and handling equipment. To overcome these adverse effects, several commercial technologies have been used for $H_2S$ removal from natural gas. The amine sweetening process is widely used in industries to lower the concentration of $H_2S$ to the target level imposed by customers and downstream processors [R. Álvarez-Cruz, B. E. Sánchez-Flores, J. Torres-González, R. Antaño-López, F. Castañeda, Insights in the development of a new method to treat $H_2S$ and $CO_2$ from sour gas by alkali, Fuel. 100 (2012) 173-176; M. Tagliabue, C. Rizzo, N. B. Onorati, E. F. Gambarotta, A. Carati, F. Bazzano, Regenerability of zeolites as adsorbents for natural gas sweetening: A case-study, Fuel. 93 (2012) 238-244—each incorporated herein by reference in its entirety]. This method is costly in term of heat required for regeneration and also produces unwanted by-products. Other treatment processes, such as membrane separation and biological treatment, either suffer from low selectivity or they are not feasible at the larger scales [ J. I. Huertas, N. Giraldo, S. Izquierdo, Removal of $H_2S$ and $CO_2$ from Biogas by Amine Absorption, in: D. J. Markoa (Ed.), Mass Transfer in Chemical Engineering Process, In Tech Europ, 2011, pp. 132-150—incorporated herein by reference in its entirety].

Adsorption, on the other hand, can be used to capture $H_2S$ at trace levels with relatively low cost of adsorbent. This process becomes especially attractive option when an adsorbent material, such as waste oil fly ash, is available in large quantities and for low cost. Waste oil fly ash is byproduct of many industrial and power generation plant operations [M. Sharma, C. Guria, A. Sarkar, A. K. Pathak, Recycle of waste fly ash: A rheological Investigation, Int. J. Sci. Environ. Technol. 1 (2012) 285-301—incorporated herein by reference in its entirety]. Waste oil fly ash usually causes environmental pollution problems and requires safe disposal. Therefore, utilization of waste oil fly ash in removing $H_2S$ is expected to solve more than one environmental problem.

Since waste oil fly ash is pozzolanic in nature, it contains mainly unburned carbon (~80%) with some inorganic oxides like $SiO_2$, $Fe_2O_3$, $Al_2O_3$, and CaO and traces of heavy metals [R. Shawabkeh, M. J. Khan, A. a. Al-Juhani, H. I. Al-Abdul Wahhab, I. a. Hussein, Enhancement of surface properties of oil fly ash by chemical treatment, Appl. Surf. Sci. 258 (2011) 1643-1650—incorporated herein by reference in its entirety]. According to a survey conducted by American Coal Ash Association (ACAA) over 100 million tons of coal combustion products were produced in 2012, where only 38% of total coal combustion products were used beneficially [American Coal Ash Association, Coal Combustion Product (CCP) Production & Use Survey Report, 2012—incorporated herein by reference in its entirety]. However, utilization rate of fly ash has increased greatly in China reaching up to 67% in 2010 compared to 20% rate in 1999 [Z. Tang, S. Ma, J. Ding, Y. Wang, S. Zheng, Current status and prospect of fly ash Utilization in China, in: 2013 World Coal Ash Conference, 2013, pp. 22-27—incorporated herein by reference in its entirety]. The majority of fly ash is used in blended cements, filler for metal matrix composites, as raw material for metal recovery and as filler for polymers [R. A. Shawabkeh, Adsorption of chromium ions from aqueous solution by using activated carbo-aluminosilicate material from oil shale., J. Colloid Interface Sci. 299 (2006) 530-6; T. P. D. Rajan, R. M. Pillai, B. C. Pai, K. G. Satyanarayana, P. K. Rohatgi, Fabrication and characterisation of Al-7Si-0.35Mg/fly ash metal matrix composites processed by different stir casting routes, Compos. Sci. Technol. 67 (2007) 3369-3377; R. Navarro, J. Guzman, I. Saucedo, J. Revilla, E. Guibal, Vanadium recovery from oil fly ash by leaching, precipitation and solvent extraction processes., Waste Manag. 27 (2007) 425-38; Q. Zeng, K. Li, T. Fen-Chong, P. Dangla, Surface fractal analysis of pore structure of high-volume fly-ash cement pastes, Appl. Surf. Sci. 257 (2010) 762-768; M. a. Al-Ghouti, Y. S. Al-Degs, A. Ghrair, H. Khoury, M. Ziedan, Extraction and separation of vanadium and nickel from fly ash produced in heavy fuel power plants, Chem. Eng. J. 173 (2011) 191-197; K. T. Hideaki Tokuyama, Susumu Nii, Fumio Kawaizumi, Characterization of Al-Cu alloy reinforced fly ash metal matrix composites by squeeze casting method, Int. J. Engg. Sci. Technol.5 (2013) 71-79; A. K. Senapati, A. Bhatta, S. Mohanty, P. C. Mishra, B. C. Routra, An extensive literature review on the usage of fly ash as a reinforcing agent for different matrices, Int. J. Innov. Sci. Mod. Eng., vol. 2, no. 3(2014) 4-9—each incorporated herein by reference in its entirety]. Recently, oil fly ash has gained particular attention as potential adsorbent for several adsorbate due to its high carbonaceous content and low cost [A. L. Yaumi, R. Aww. K. ShaWabkeh, ilbnesllvaleed A. Hussem, United States Patent, U.S. Pat. No. 8,545,781 B1, 2013; A. L. Yaumi, I. a. Hussien, R. a. Shawabkeh, Surface modification of oil fly ash and its application in selective capturing of carbon dioxide, Appl. Surf. Sci. 266 (2013) 118-125; B. Rubio, M. T. Izquierdo, Coal fly ash based carbons for $SO_2$ removal from flue gases., Waste Manag. 30 (2010) 1341-7; CN103626174A; US20140197020A1; KR996431B1—each incorporated herein by reference in its entirety]. Izquierdo et al studied $SO_2$ removal using activated carbon (AC) produced from oil agglomerated coal fly ash. They compare the adsorption efficiency of anthracite coal based fly ash activated carbon with bituminous-lignite blended coal fly ash activated carbon and concluded that the latter is superior with 28 mg/g uptake capacity [B. Rubio, M. T. Izquierdo, Coal fly ash based carbons for SO2 removal from flue gases., Waste Manag. 30 (2010) 1341-7—incorporated herein by reference in its entirety]. With some chemical treatment, the porosimetric characteristics of ash may be enhanced to obtain a high surface area AC. Thus obtained, AC can be used to remove pollutants from flue gas. Yaumi et al. used treated oil fly ash for the adsorption of $CO_2$ under different flow conditions. A removal capacity of 240 mg $CO_2$/g-treated OFA was achieved. The interactions between $CO_2$ and ash surface were reported to be endothermic in nature [A. L. Yaumi, R. Aww. K. ShaWabkeh, ilbnesllvaleed A. Hussem, United States Patent, U.S. Pat. No. 8,545,781 B1, 2013; A. L. Yaumi, I. a. Hussien, R. a. Shawabkeh, Surface modification of oil fly ash and its application in selective capturing of carbon dioxide, Appl. Surf. Sci. 266 (2013) 118-125—each incorporated herein by reference in its entirety].

Various treatment strategies could be implemented to increase the porosity and create some ordering of structure like in the synthesis of zeolites [A. Alastuey, E. Herna, X. Querol, N. Moreno, J. C. Uman, F. Plana, Synthesis of zeolites from coal fly ash: an overview, Int. J. Coal Geol 0.50 (2002) 413-423; M. Wdowin, M. Franus, R. Panek, L. Badura, W. Franus, The conversion technology of fly ash into zeolites, Clean Technol. Environ. Policy. (2014). M. Visa, A. Duta, $TiO_2$/fly ash novel substrate for simultaneous removal of heavy metals and surfactants, Chem. Eng. J. 223 (2013) 860-868; M. M. Maroto-valer, Z. Lu, Y. Zhang, Z. Tang, Sorbents for $CO_2$ capture from high carbon fly ashes, Waste Manag. 28 (2008) 2320-2328—each incorporated herein by reference in its entirety]. For example, external heating of fly ash with acid mixture involves various sulfonation and nitrification reactions including the formation of phosphate functional groups. As a result oxides of sulfur and nitrogen and carbon dioxide are released during the chemical activation process [B. Bournonville, A. Nzihou, P. Sharrock, G. Depelsenaire, Stabilisation of heavy metal containing dusts by reaction with phosphoric acid: study of the reactivity of fly ash., J. Hazard. Mater. 116 (2004) 65-74; R. A. Shawabkeh, Synthesis and characterization of activated carbo-aluminosilicate material from oil shale, Microporous Mesoporous Mater. 75 (2004) 107-114—each incorporated herein by reference in its entirety]. Treatment of fly ash with acids also introduces hydrophilic groups like carboxylic and hydroxyl groups on the surface of ash [E. D. Dimotakis, M. P. Cal, J. Economy, M. J. Rood, S. M. Larson, Chemically treated activated carbon cloths for removal of volatile organic carbons from gas streams: evidence for enhanced physical adsorption., Environ. Sci. Technol. 29 (1995) 1876-80—incorporated herein by reference in its entirety].

Several kinds of carbon based adsorbents have been employed to capture $H_2S$ from gas stream. These adsorbents include agro-based activated carbon, coal based and impregnated activated carbon [J. Kazmierczak, P. Nowicki, R. Pietrzak, Sorption properties of activated carbons obtained from corn cobs by chemical and physical activation, Adsorption. 19(2013) 273-281; H. S. Choo, L. C. Lau, A. R. Mohamed, K. T. Lee, Hydrogen sulfide adsorption by alkaline impregnated coconut shell activated carbon, J. Eng. Sci. Technol. 8 (2013) 741-753; D. Choi, J. Lee, S. Jang, B. Aim, D. Choi, Adsorption dynamics of hydrogen sulfide in impregnated activated carbon bed, Adsorption. 14 (2008) 533-538; A. Bagreev, J. Angel Menendez, I. Dukhno, Y. Tarasenko, T. J. Bandosz, Bituminous coal-based activated carbons modified with nitrogen as adsorbents of hydrogen sulfide, Carbon. 42 (2004) 469-476—incorporated herein by reference in its entirety].

In view of the foregoing, there remain numerous, ongoing efforts directed towards development of processes for preparing activated carbon with new raw materials. The present disclosure provides a process for manufacturing modified, mesoporous activated carbon where the carbon activation procedure is relatively simple and straightforward, and the surface area of the activated carbon can be dramatically increased during the manufacturing process.

BRIEF SUMMARY OF THE INVENTION

In a first aspect, there is provided a process for preparing an activated carbon material. The process comprises refluxing a waste oil fly ash powder with a first acid solution to form a solid residue and heating the solid residue at 900-1050° C. and purging the solid residue in a flow of carbon dioxide to form the activated carbon material.

In certain embodiments, the first acid solution comprises one or more acids selected from the group consisting of sulfuric acid, nitric acid and phosphoric acid. In one embodiment, the first acid solution comprises two acids at a volume ratio of 1-13:1-13. In another embodiment, the first acid solution comprises three acids at a volume ratio of 1-8.5:1-8.5:1-8.5.

In one or more embodiments, the refluxing is carried at 100-150° C. for 3-6 h and at a concentration of 10-100 g of the waste oil fly ash powder per liter of the first acid solution.

In one or more embodiments, the heating is carried out for 30-90 min.

In one or more embodiments, the purging is carried out for 15-45 min, at 1-5 bar and at a carbon dioxide flow rate of 0.5-2.0 L/min.

In some embodiments, the solid residue is not chemically modified during the purging.

In one embodiment, the solid residue has a pH value of 5.5-7.5.

In certain embodiments, the process for preparing the activated carbon material further comprises contacting and refluxing the activated carbon material with a second acid solution or an ammonia solution to attach carboxylic groups or amine groups onto the surface of the activated carbon material. In one embodiment, the second acid solution is a nitric acid solution. In one or more embodiments, the contacting and the refluxing are carried out at 80-120° C. for 3-6 h and at a concentration of 50-200 g of the activated carbon material per liter of the second acid solution or the ammonia solution.

In some embodiments, the refluxing, the heating and the purging increase the BET surface area of the activated carbon material, increase the total pore volume of the activated carbon material and reduce the average pore size of the activated carbon material.

In a second aspect, the present disclosure provides an activated carbon material prepared by the process according to the first aspect of the disclosure. The activated carbon material has a BET surface area of 30-400 $m^2$/g, a total pore volume of 0.25-0.50 $cm^3$/g and an average pore size of 40-100 Å.

In a third aspect, the present disclosure relates to a method for removing hydrogen sulfide from a gaseous stream. The method comprises contacting the gaseous stream with the activated carbon material according to the second aspect of the disclosure.

In one or more embodiments, the gaseous stream is a natural gas stream.

In certain embodiments, the activated carbon material has a concentration of 0.01-0.05 g per ppm of the hydrogen sulfide present in the gaseous stream.

In one embodiment, the activated carbon material is affixed to a packed bed of an adsorption column and the gaseous stream is passed through the packed bed at 0.1-1.0 L/min at atmospheric pressure and at ambient temperature.

In one embodiment, the activated carbon material adsorbs the hydrogen sulfide and has a hydrogen sulfide adsorption capacity of 0.10-0.35 mg of hydrogen sulfide per gram of the activated carbon material.

In one embodiment, the activated carbon material has a regeneration efficiency of 40-90%.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Referring now to the drawings, wherein like reference numerals designate identical or corresponding parts throughout the several views.

In the present disclosure, there are provided processes for manufacturing modified, mesoporous activated carbon by physicochemical treatment of waste oil fly ash.

As used herein, the term "waste oil fly ash" or "waste oil flue ash" or "oil fly ash" or "oil flue ash" or OFA refers to a waste residue generated in combustion of heavy fuel oil, for example, in power generation plants. Waste oil fly ash comprises fine ash particles that rise together with flue gases. Waste oil fly ash has a carbon content of at least 70% by weight, preferably 70-75%, 75-80%, more preferably 80-85% 85-90%, 90-95%, with the rest of the components being primarily metals or semimetals such as but not limited aluminum, magnesium, calcium, vanadium, nickel, copper, zinc chromium, cobalt, lead, manganese, mercury, molybdenum, selenium strontium, thallium, arsenic, beryllium, boron, cadmium, as well as silicon and/or silica, sulfur, oxygen, organic compounds including but not limited to dioxins or polychlorinated dibenzodioxins (PCDDs) and polyaromatic hydrocarbons (PAHs). In certain embodiments, the oxygen content and the sulfur content of the waste oil fly ash each range 2-25% by weight, preferably 3-20%, more preferably 4-15%, even more preferably 5-10%. In some embodiments, each of the elements aluminum, magnesium, calcium, vanadium, nickel, copper, zinc and silicon constitutes 0.01-5.0% of the waste oil fly ash by weight, preferably 0.01-2.5%, preferably 0.02-2.0%, preferably 0.05-1.0%, more preferably 0.1-0.5%.

As used herein, a "mesoporous activated carbon" refers a porous activated carbon material where the average pore size is within the range of 40-100 Å of 4-10 nm. Accordingly, the term "mesopore" as used herein refers to a pore having a diameter of 40-100 Å. The term "micropore" refers to a pore having a diameter of less than 40 Å. The term "macropore" refers to a pore having a diameter that exceeds 100 Å.

After collection, a raw waste oil fly ash sample can be advantageously subjected to pretreatment such as drying and dry-sieving with a 35-400 μm mesh, preferably 35-250 μm, more preferably 35-150 μm, even more preferably 35-105 μm, most preferably 35-75 μm.

The waste oil fly ash powder is then mixed with an acid solution to a final concentration of 10-100 g/L (g of waste oil fly ash powder per volume of acid solution), preferably 15-75 g/L, more preferably 25-50 g/L and mixed well. The waste oil fly ash-acid suspension is then refluxed at 100-150° C., preferably 115-135° C. for 3-6 h or until sufficiently treated. In one embodiment, the reflux condition is 125° C. and 4 h. The acid solution contains one or more inorganic or mineral acids selected from nitric acid, sulfuric acid, phosphoric acid, perchloric acid, hydrobromic acid, hydrochloric acid, hydroiodic acid, hydrofluoric acid and boric acid. In certain embodiments, the acid solution contains two or three mineral acids selected from nitric acid, sulfuric acid and phosphoric acid, at volume ratios of 1-13:1-13 (35-65 vol. %:35-65 vol. %) for two acids or 1-8.5:1-8.5:1-8.5 (15-42.5 vol. %:15-42.5 vol. %:15-42.5 vol. %) for three acids. However, due to exceedingly strong oxidizing capacities which can be detrimental towards the mass and other structural properties of the final activated carbon product, a mixture consisting of nitric acid and sulfuric acid is avoided. In one embodiment, the acid solution contains 20 vol. % sulfuric acid, 40 vol. % nitric acid and 40 vol. % phosphoric acid. In other embodiments, the acid solution contains 100 vol. % phosphoric acid; 40 vol. % nitric acid and 60 vol. % phosphoric acid; 100 vol. % nitric acid; 40 vol. % sulfuric acid and 60 vol. % phosphoric acid; 40 vol. % sulfuric acid, 20 vol. % nitric acid and 40 vol. % phosphoric acid; or 100 vol. % sulfuric acid. In alternative embodiments, one or more organic acids may be used to prepare the acid solution. Examples of organic acids include but are not limited to formic acid, acetic acid, propionic acid, butyric acid, valeic acid, caproic acid, oxalic acid, lactic acid, malic acid, citric acid, carbonic acid, benzoic acid, phenol, uric acid, carboxylic acids and sulfonic acid. In another embodiment, the acid solution may contain mixtures of mineral and organic acids at volume ratios defined above.

A solid residue is obtained at the end of the acid treatment, which may be filtered and rinsed repeatedly with distilled water, then dried. The purpose of rinsing the solid residue with high amounts of distilled water is to wash away the acid solution and to prepare the waste oil fly ash sample for physical inactivation by increasing the pH of the solid residue to 5.5-7.5, preferably 6.0-7.0.

Next, the dried, acid-treated waste oil fly ash sample is activated under $CO_2$ flow at 900-1050° C., preferably 925-1025° C., more preferably 950-1000° C., even more preferably 975-1000° C. The sample is heated for 30-90 min, preferably 45-75 min, and purged with $CO_2$ for 15-45 min, preferably 20-40 min. The pressure at which the $CO_2$ purging is performed is 1-5 bar, preferably 1.5-3 bar, while the $CO_2$ flow rate is kept at 0.5-2.0 L/min, preferably 1.0-1.5 L/min. The acid-treated waste oil fly ash sample is preferably not chemically modified by the $CO_2$ gas. The degree of burn-off after the acid chemical treatment and heated $CO_2$-infused physical activation, calculated based on measured weight difference between the untreated waste oil fly ash sample and the treated activated carbon, is 5-95%, preferably 10-75%, more preferably 20-60%.

In some embodiments the acid-treated activated carbon sample is further functionalized by attaching carboxylic groups and/or amine groups onto the surface of the activated carbon. To add carboxylic functional groups the acid-treated activated carbon sample is mixed with a second acid solution at a concentration of 50-200 g/L (g of activated carbon per volume of second acid solution), preferably 75-150 g/L, more preferably 100-125 g/L. The activated carbon-acid mixture is then heated at 80-120° C., preferably 85-100° C. for 3-6 h for a total reflux. In certain embodiments, the second acid solution contains a strong inorganic acid and is selected from nitric acid, sulfuric acid and hydrochloric acid. In one embodiment the second acid solution is nitric acid solution. In alternative embodiments, the second acid solution is an organic acid solution with examples as set forth herein.

To add amine functional groups, the same procedure is performed on the physicochemically treated activated carbon sample but with an ammonia or ammonium hydroxide solution. In one embodiment an activated carbon sample is functionalized with both carboxylic and amine groups. Accordingly, the reflux cycles with an acid solution and an ammonia solution are performed sequentially.

The amount of functional groups attached to the surface of the physicochemically treated activated can be determined, for example, by conventional elemental analysis techniques such as CHN analysis and mass spectrometric atomic spectroscopy and X-ray photoelectron spectroscopy (i.e. measuring nitrogen content to determine amine group content or oxygen content to determine carboxylic group content).

A physicochemically treated, non-functionalized activated carbon prepared according to a process described herein has a Brunauer-Emmett-Teller (BET) surface area of 30-400 $m^2/g$, preferably 50-400 $m^2/g$, 70-400 $m^2/g$, more preferably 100-400 $m^2/g$, 120-400 $m^2/g$, 180-400 $m^2/g$, even more preferably 250-400 $m^2/g$, 300-400 $m^2/g$, 350-400 $m^2/g$, most preferably 375-400 $m^2/g$. Comparatively, raw untreated waste oil fly ash has a BET surface area of 1-5 $m^2/g$. Although the chemical treatment with acid alone can increase the surface area of waste oil fly ash by up to 20-25 times, it is the combination of the acid treatment and the heated $CO_2$ physical activation that is found to synergistically increase the surface area by up to 140-155 times.

On the other hand, a physicochemically treated activated carbon of the present disclosure that is further functionalized with amine groups, carboxylic groups or both has a BET surface area of 25-100 $m^2/g$, preferably 30-90 $m^2/g$, more preferably 35-85 $m^2/g$, even more preferably 40-100 $m^2/g$, 50-100 $m^2/g$, 60-100 $m^2/g$, 70-100 $m^2/g$, 80-100 $m^2/g$, 40-90 $m^2/g$, 50-90 $m^2/g$, 60-90 $m^2/g$, 70-90 $m^2/g$, 80-90 $m^2/g$.

The physicochemical treatment of the waste oil fly ash sample is effective in removing non-carbonaceous impurities from the sample and thereby increasing the carbon content of the activated carbon. Accordingly, the activated carbon has a carbon content of at least 90%, preferably 90-95%, more preferably 95-99.9%. The oxygen content of the activated carbon after the physicochemical treatment is no more than 20%, preferably no more than 10%, more preferably no more than 5%, even more preferably no more than 2.5%. The sulfur content of the physicochemically treated activated is no more than 5%, preferably no more than 2.5%, more preferably no more than 1%. Other minerals, combined, are present only in trace quantities, constituting no more than 0.1% of the treated activated carbon, preferably no more than 0.05%, more preferably no more than 0.01%. The oxygen/carbon content of the physicochemically treated activated carbon is 0.005-0.2, preferably 0.01-0.1, more preferably 0.02-0.05. In certain embodiments, functionalization with amine groups results in a further slight increase in the carbon content of the activated carbon.

The activated carbon prepared in accordance with at least one of the processes described herein (with or without functionalization) has a total pore volume of 0.25-0.50 $cm^3/g$, preferably 0.25-0.45 $cm^3/g$, more preferably 0.30-0.40 $cm^3/g$, with an average pore size of 40-100 Å, preferably 40-80 Å, more preferably 45-55 Å, even more preferably 50-55 Å (or 4-10 nm, 4-8 nm, 4.5-5.5 nm and 5.0-5.5 nm, since 1 Å=0.1 nm). In comparison, raw, untreated waste oil fly ash has a total pore volume of 0.02-0.05 $cm^3/g$ and an average pore size of 250-300 Å (25-30 nm).

At least 50% of the pores are in the diameter range of 40-100 Å, preferably 50-95%, more preferably 60-90%, most preferably 70-85%. The macropore/mesopore amount ratio of the physicochemically treated activated carbon is 0.001-0.05, preferably 0.002-0.02, more preferably 0.005-0.01. The micropore/mesopore amount ratio of the treated activated carbon is 0.002-0.1, preferably 0.005-0.05, more preferably 0.01-0.03.

Another embodiment of the present disclosure relates to a method for removing hydrogen sulfide from a gaseous stream or sample with the activated carbon provided herein. In one embodiment, the gas stream or gaseous sample is natural gas. As used herein, natural gas is composed primarily of methane (e.g. 80% or higher) and varying small amounts of $C_2$-$C_5$ alkanes, carbon dioxide, nitrogen and hydrogen sulfide. In accordance with the present disclosure, a natural gas stream is contacted with the modified, mesoporous activated carbon where the hydrogen sulfide in the gas stream is effectively adsorbed by the activated carbon. In one embodiment, the activated carbon is in a fixed mode. For example, the activated carbon can be affixed to the packed bed of an adsorption column and the natural gas stream is passed through the packed bed of activated carbon at 0.1-1.0 L/min, preferably 0.1-0.5 L/min at atmospheric or near atmospheric pressure and at ambient temperature (20-26° C.). In another embodiment, the gaseous stream or sample is an air sample or an effluent stream.

The amount of activated carbon required for the hydrogen sulfide removal in the method is 0.01-0.05 g per ppm of hydrogen sulfide present in the gas stream, preferably 0.02-0.04 g. The hydrogen sulfide adsorption capacity of the modified activated carbon in the method is 0.10-0.35 mg of hydrogen sulfide per gram of the activated carbon, preferably 0.20-0.35 mg, more preferably 0.25-0.35 mg. A spent activated carbon can also be regenerated and reused with a regeneration efficiency of 40-90%, preferably 55-90%, more preferably 80-90%.

In at least one embodiment, physicochemically treated activated carbon that is further functionalized with amine groups and has an average pore size of 50-55 Å is found to display the highest hydrogen sulfide capacity. The nitrogen content of the activated carbon functionalized with amine groups, as determined by any of the aforementioned elemental analysis techniques, is 5-30%, preferably 10-25%, more preferably 15-20%.

EXAMPLES

The following examples have been included to further describe protocols for synthesizing and characterizing modified, mesoporous activated carbon from waste oil fly ash, as well as methods for removing hydrogen sulfide from natural gas with the activated carbon. It should be noted that these examples have been included for illustrative purposes, and are not intended to limit the scope of the appended claims.

Due to low cost and large amount of unburned carbon, waste oil fly ash (OFA) can become an attractive choice material for the removal of $H_2S$ from natural gas. In the following examples, it is shown that physicochemical treatments not only remove the mineral matter from ash but also result in a product with very high surface area. BET analysis shows an increase in the surface area from few square meters per gram to 375 $m^2/g$. SEM images of the prepared activated carbon material show an increase in the number of micropores, well-developed particle size and porous structure due to activation with $CO_2$ at a high temperature. These examples demonstrate that proper combination of surface porosity and functional groups can lead to a suitable adsorbent for $H_2S$ removal. Amine treatment after $CO_2$ activation leads to the formation of nitrogen functionalities on the carbon surface at the expense of reducing the surface area. The results are confirmed by BET analyses. On the other hand, $HNO_3$ functionalization of high surface area activated carbon has an adverse effect. The equilibrium capacity is reduced from 0.2966 mg/g to 0.1035 mg/g. The results indicate that the presence of more acidic functionalities on the surface reduces the $H_2S$ adsorption efficiency from the gas mixture. Regeneration efficiency of the samples show that acid treatment followed by $CO_2$ activation at high temperature give the best option for removal of $H_2S$ for OFA. In conclusion, the following examples show that physicochemical activation of a waste OFA sample can not only reduce a waste disposal problem and environmental pollution, but can also convert a waste product to a useful adsorbent.

Example 1

Materials

Raw waste oil fly ash (OFA) was collected from Rabigh power plant located in Saudi Arabia. It was dried overnight at 110° C. in the oven to remove moisture; sieved to 45 μm mesh; and stored in closed containers for further use. Elemental composition and porosity characterization results for untreated OFA are given in Table 1. The results show the presence of a high percentage of carbon in OFA (~80%). Analytical grade nitric, phosphoric and sulfuric acids were supplied by Panreac Company, Spain. Ammonium hydroxide solution (25% w/w) with a density of 0.9g/$cm^3$ was obtained from Scharlau Company, Spain. Synthetic natural gas containing 50 ppm $H_2S$ in methane was supplied by Saudi Gas Company. The Pyrex glassware was washed with demineralized water and dried in the oven at 105° C.

TABLE 1

Elemental composition and porosimetric characteristics of waste oil fly ash before treatment.

| Element | Weight percentage (wt. %) |
|---|---|
| C | 77.40 |
| S | 7.10 |
| O | 9.32 |
| Al | 0.25 |
| Mg | 1.41 |
| Ca | 0.23 |
| V | 1.29 |
| Ni | 0.68 |
| Cu | 1.70 |
| Zn | 0.40 |
| Si | 0.08 |
| Fe | 0.14 |
| BET Surface area ($m^2/g$) | 2.63 |
| Micro pore surface Area ($m^2/g$) | 0 |
| Pore Volume ($cm^3/g$) | 0.03 |
| t-plot Micro pore Volume ($cm^3/g$) | 0 |

Example 2

Activation of Waste Oil Fly Ash

The activation process involves two steps: chemical treatment followed by physical activation with $CO_2$ at an elevated temperature. In a typical run, a sample of 10 g OFA powder was treated with 200 ml of an acid mixture in a round-bottom flask at 125° C. for 4 h under total reflux condition. Acid mixtures of different concentrations of $HNO_3$, $H_3PO_4$ and $H_2SO_4$ were used as shown in Table 2. The treated samples were filtered to obtain the solid residue. The residue was then rinsed repeatedly with distilled water to wash out the acid contents until a pH of spent acid has reached 6. The reason is that at higher temperatures desorption of oxygen functional groups and acid contents could create nascent sites on the surface of fly ash which will be more easily attacked by $CO_2$. In addition, removal of all acid will require high amounts of water. Finally, the solid residue was dried in an oven at 110° C. for 5 h. After that, the dried ash sample was subjected to physical activation with $CO_2$ at 990° C. in a programmable Lindberg Blue M tube furnace. The furnace was programmed to increase the temperature at a rate of 50° C./min. Once the required temperature was reached, a long horizontal tube (ID=1 cm)containing 6 g sample was heated to 990° C. for 1 hr and purged with 1L/min of $CO_2$ for 30 min. The inlet pressure of $CO_2$ was set to 2 bar. Finally, the sample was cooled to room temperature and the product was kept in a desiccator for further characterization. The degree of burn off α (wt. %), is calculated using Eq. 1:

$$\alpha = (W_i - W_f)/W_i \quad \text{(Eq. 1)}$$

where $W_i$=initial mass of sample and $W_f$=final mass of sample, after $CO_2$ activation.

Example 3

Ammonia and Nitric Acid Treatment

A sample of 5 g of acid treated oil fly ash was mixed with 50 ml of $NH_4OH$ solution in a round-bottom flask and heated at 90° C. for 4 h at total reflux. The mixture was then cooled, filtered and washed 5 times with 500 ml water. Filter cake was dried in an oven at 110° C. A similar procedure was repeated for the physicochemically treated OFA, where the sample was refluxed with $HNO_3$.

Example 4

Surface Area and Pore Size Determination

Micrometrics ASAP 2020 instrument was used to determine the BET surface area pore volume and other surface properties of sample like pore size distribution. A sample of 0.43 g treated OFA was degassed at 573 K for 2 h under vacuum, and then $N_2$ gas was adsorbed-desorbed at 77 K. Micro-pore volume was determined by the t-plot method [B. C. Lippens, J. H. De Boer, Studies on Pore Systems in Catalysts, J. Catal. 4(1965) 319-323—incorporated herein by reference in its entirety].

The activation of OFA with acid affects the porosity of ash compared to the raw material. The BET surface areas were determined from $N_2$ adsorption isotherms at 77 K. Table 2 summarizes the results of BET analyses after acid and physical treatment with $CO_2$. The acid treatment of OFA has leached out almost all major inorganic matter and increases the porosity. The surface area of acid treated OFA depends on the oxidation ability of the acid mixture. Based on O/H ratio in the chemical formula of the acid, the oxidation tendency of the acid increases according to the order $HNO_3 > H_2SO_4 > H_3PO_4$. Chemical treatment with mixtures of $HNO_3/H_3PO_4$ (without $H_2SO_4$) generates the highest surface area corresponding to 57.34 m²/g compared to single individual acid treatment. The incorporation of $H_2SO_4$ increases the degree of oxidation of the surface and makes the pore walls thinner thus easily damaged by $HNO_3$. As a result micropores get enlarged to mesopores and consequent diminishing of surface area values. For a combination of $H_3PO_4/H_2SO_4$, the acid treatment of ash experienced a very small weight loss of 0.1% as compared to other combinations and produces 0.66 m²/g BET surface area except for only $H_2SO_4$ for which surface area is 8.41 m²/g. This may be attributed to damage of pore structure or the formation of phosphate layer which covers the pore structure [B. S. Girgis, A.-N. a. El-Hendawy, Porosity development in activated carbons obtained from date pits under chemical activation with phosphoric acid, Microporous Mesoporous Mater. 52 (2002) 105-117—incorporated herein by reference in its entirety]. When ash was treated with a strong oxidizing mixture, consisting of only $HNO_3/H_2SO_4$ the weight loss was 91.3%. This shows strong oxidation conditions can destroy the carbon structure and pose a negative impact and may result in decreasing the surface area to a value less than that of raw OFA (i.e. 2.63 m²/g). Surface activation with the three acids at different volume ratios produced higher values of surface area compared to untreated OFA. Different acid compositions have different impact on weight loss of OFA. However, OFA treated with higher ratio of $HNO_3/H_2SO_4$ mixture showed a higher degree of weight loss in comparison with $H_3PO_4/H_2SO_4$. Raw OFA samples treated with a combination of the three acids generated the higher surface areas after $CO_2$ activation. Samples having surface area greater than 250 m²/g experienced a burn-off greater than 50%. This shows that the surface of OFA treated with more oxidizing mixture is more prone to the reaction of $CO_2$ with carbon that is essential in generating micro porosity, which leads to an increase of the surface area. Out of all different acid formulations covered in this study, OFA sample activated with 20% $H_2SO_4$, 40% $HNO_3$ and 40% $H_3PO_4$ (i.e. sample A4) generated the highest surface area (~375.69 m²/g) after $CO_2$ activation as shown in Table 2. Consequently, OFA samples treated with this acid composition are further characterized for pore size distribution.

TABLE 2

Impact of physicochemical T = treatment on BET surface areas.

| | Percentage of acids | | | Chemical Treatment | | $CO_2$ Activation | |
|---|---|---|---|---|---|---|---|
| | | | | Weight Loss | BET surface area | Burn off (%) after $CO_2$ | BET surface area |
| No. | $H_2SO_4$ | $HNO_3$ | $H_3PO_4$ | (%) | (m²/g) | activation | (m²/g) |
| 1 | 0 | 0 | 100 | 7.3 | 1.40 | 12.2 | 49.60 |
| 2 | 0 | 40 | 60 | 41.5 | 57.34 | 37.8 | 120.59 |
| 3 | 0 | 100 | 0 | 56.7 | 19.02 | 32.6 | 104.61 |
| 4 | 20 | 40 | 40 | 56.3 | 4.05 | 55.1 | 375.69 |
| 5 | 40 | 0 | 60 | 0.1 | 0.66 | 0.8 | 33.07 |
| 6 | 40 | 20 | 40 | 12.5 | 4.14 | 35.1 | 195.52 |
| 7 | 40 | 60 | 0 | 91.3 | 1.23 | 56.4 | 281.22 |
| 8 | 100 | 0 | 0 | 20.5 | 8.41 | 3 | 72.15 |
| 9 | 0 | 0 | 0 | — | 2.63 | 5.61 | 7.49 |

Figure 2A:
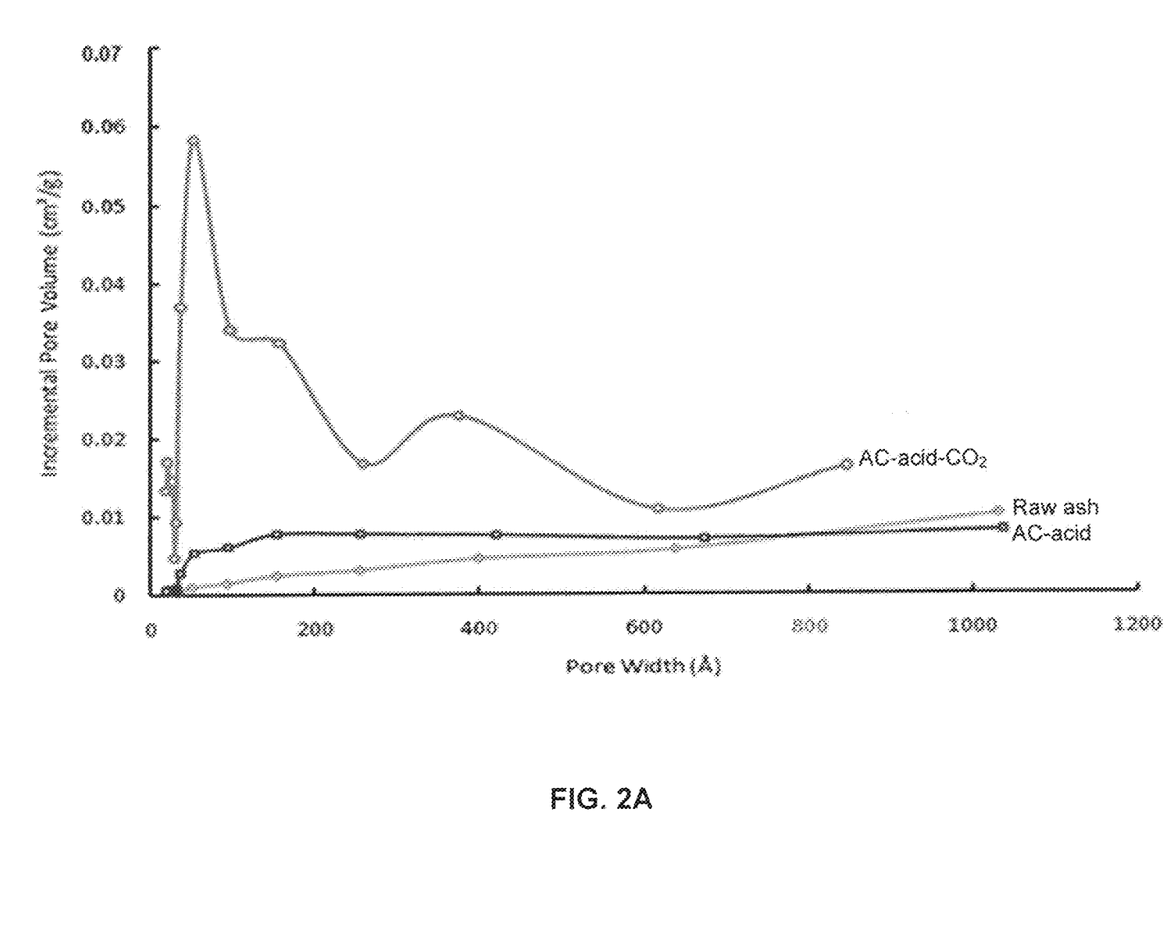
FIG. 2A shows the pore size distribution of waste oil fly ash samples before treatment.
Figure 2B:
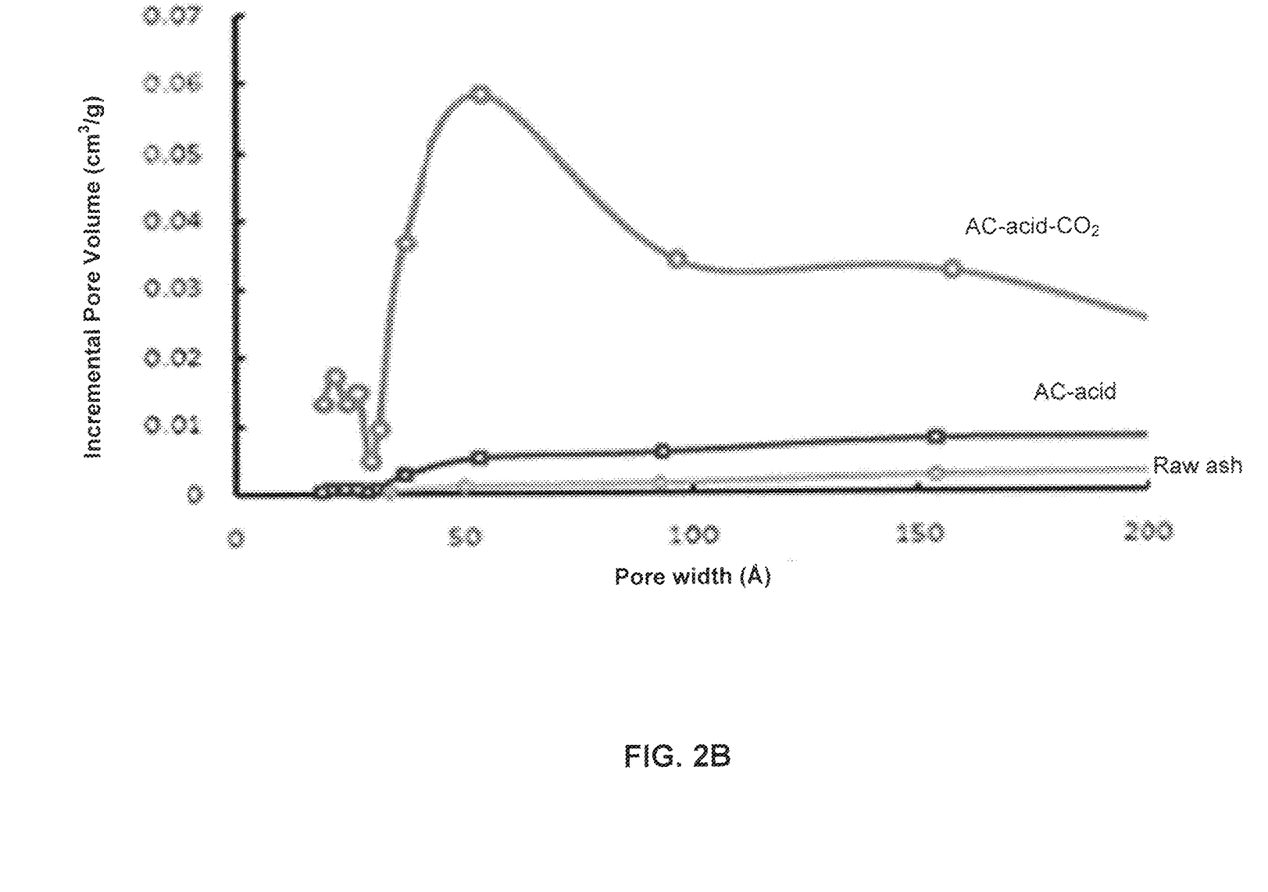
FIG. 2B shows the pore size distribution of waste oil fly ash samples after treatment.

FIGS. 2A and 2B show the pore size distribution for ash samples before and after treatment with acid mixture of 20% $H_2SO_4$, 40% $HNO_3$ and 40% $H_3PO_4$, respectively. The original ash sample has low pore size distribution and the pore volume increases with the increase in pore width. The total pore volume is related to the macropores for raw ash. Activation with acid mixture has increased the mesopore volume and decreases the macropores with an increase of total pore volume of 0.0257cm$^3$/g over the original ash sample. Further treatment with $CO_2$ at 990° C. has opened up more micro and mesopores while macropores has decreased with an average mesopore size of 50 Å. When the sample was treated with $CO_2$ at elevated temperatures micropores were generated with an average pore size of 50 Å compared to 109 Å obtained after acid treatment. Functionalization of selected samples with $HNO_3$ has increased the pore size to 54 Å but the surface area decreased to 39.03 m$^2$/g from its original value of 375 m$^2$/g.

The decrease in surface area could be attributed to the damage of the pore network by generating aggregation and alignment in the ash structure. Subsequent surface modification of selected sample with $HNO_3$ and $NH_4OH$ enlarged some of the micropores to produce more mesopores as shown in Table 3. Surface area has been reduced from 375 m$^2$/g of $AC_{acid-CO2}$ to 80 m$^2$/g and 39 m$^2$/g during functionalization with $NH_4OH$ and $HNO_3$, respectively. This is likely due to the decrease in pore volume. High surface area of $AC_{acid-CO2}$ allows both ($NH_4OH$ and $HNO_3$) functionalizing agents to penetrate inside and react readily with carbon particles. The total pore volume (Table 3) of $AC_{acid-CO2-NH4OH}$ and $AC_{acid-CO2-HNO3}$ is higher than that of $AC_{acid-CO2}$ which is due to higher meso and macro porosity. Consequently, the average pore size decreased from 280 Å to 53 Å and 54 Å for $AC_{acid-CO2-NH4OH}$ and $AC_{acid-CO2-HNO3}$, respectively.

TABLE 3

Textural properties of waste oil fly ash sample A4 at different stages of activation and functionalization.

| Sample ID | $S_{BET}$ (m$^2$/g) | t-plot micropore Volume, $V_{micro}$, (cm$^3$/g) | Total Pore Volume, $V_{0.99}$, (cm$^3$/g) | *$V_{meso}$ (cm$^3$/g) | Average Pore Size (4 v/A) (Å) |
|---|---|---|---|---|---|
| Raw OFA | 2.63 | 0 | 0.03 | 0.03 | 280 |
| $AC_{acid}$ | 4.05 | 0.0010 | 0.0557 | 0.0547 | 109 |
| $AC_{acid-CO2}$ | 375.69 | 0.0791 | 0.3002 | 0.2211 | 50 |
| $AC_{acid-CO2-NH4OH}$ | 80.27 | 0.0672 | 0.3895 | 0.3223 | 53 |
| $AC_{acid-CO2-HNO3}$ | 39.03 | 0.0600 | 0.3530 | 0.2930 | 54 |

*$V_{meso} = V_{0.99} - V_{micro}$;
AC = Activated Carbon

Example 5

Surface Morphology

A JEOL Scanning Electron Microscopy (Model JSM6400) in conjunction with Energy Dispersive Spectrophotometer (EDX) operated with 15 kV accelerating voltage was used to analyze the morphology of ash samples. Each sample was coated with a thin layer of gold before the analysis. Elemental composition of the sample was determined by analyzing the X-ray spectrum generated through spot analysis.

The EDX results of selected OFA treated samples are summarized in Table 4. The results show increase in oxygen to carbon ratio due to the leaching of some elements from raw OFA. Sulfur is reduced from 7.1 wt. % to 0.51 wt. % after acid treatment. The possible reasons are either oxidation of sulfur to $SO_2$ or the removal of free elemental sulfur during the washing step or a combination of these two processes. Sulfur dioxide is produced due to the strong interaction of $HNO_3$ with sulfate and pyrite sulfur in untreated OFA [R. Shawabkeh, M. J. Khan, A. a. Al-Juhani, H. I. Al-Abdul Wahhab, I. a. Hussein, Enhancement of surface properties of oil fly ash by chemical treatment, Appl. Surf. Sci. 258 (2011) 1643-1650—incorporated herein by reference in its entirety]. Subsequent $CO_2$ activation of acid treated ash breaks up some carbon bonding from the structure of ash and produces gaseous CO and carbon on the surface with oxygen chemisorbed on to it known as "surface-oxygen complex". Under the reaction conditions, surface-oxygen complex may either become stable and inhibit further reaction of $CO_2$ with carbon surface by blocking the reaction sites or it decomposes to CO leaving a free surface carbon atoms available for further reaction [H. Marsh, F. R. Reinoso, Activated Carbon, 1st ed., Elsevier Ltd, New York, 2006, p. 243-245—incorporated herein by reference in its entirety].

TABLE 4

Average atomic composition of waste oil fly ash sample A4 after activation.

| Element | $AC_{acid}$ | $AC_{acid-CO2}$ | $AC_{acid-CO2-NH4OH}$ | $AC_{acid-CO2-HNO3}$ |
|---|---|---|---|---|
| Carbon (%) | 79.43 | 95.71 | 96.79 | 83.61 |
| Oxygen (%) | 20.06 | 3.35 | 1.67 | 15.77 |
| Sulfur (%) | 0.51 | 0.93 | 1.54 | 0.62 |

TABLE 4-continued

Average atomic composition of waste oil fly ash sample A4 after activation.

| Element | $AC_{acid}$ | $AC_{acid-CO2}$ | $AC_{acid-CO2-NH4OH}$ | $AC_{acid-CO2-HNO3}$ |
|---|---|---|---|---|
| O/C | 0.252 | 0.035 | 0.017 | 0.188 |
| Weight Loss (%) | 56.2 | 55.1 | 11 | 35 |

*AC = activated carbon and subscript shows the activation procedure.

Figure 3A:
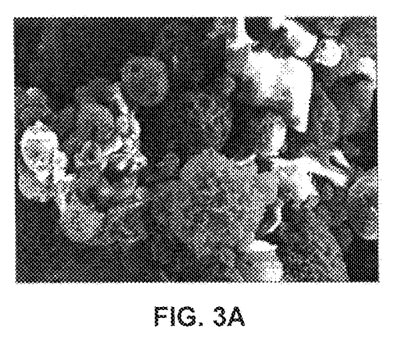
FIG. 3A is an SEM image of the surface of a waste oil fly ash raw sample.
Figure 3B:
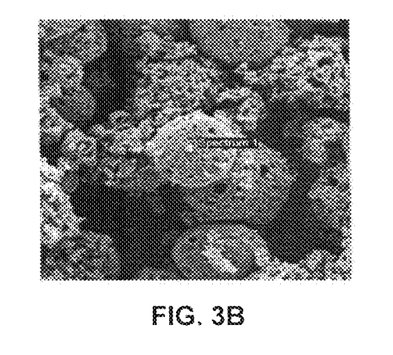
FIG. 3B is an SEM image of the surface of an acid-treated waste oil ash sample.
Figure 3C:
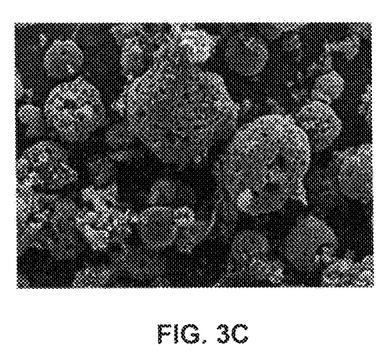
FIG. 3C is an SEM image of the surface of a $CO_2$-activated waste oil ash sample.
Figure 3D:
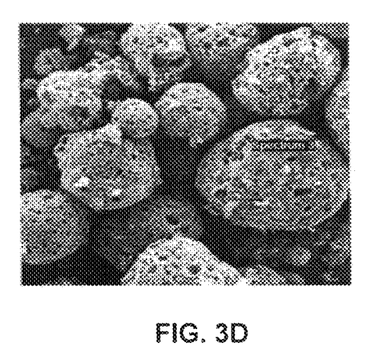
FIG. 3D is an SEM image of the surface of a $NH_4OH$-functionalized treated waste oil ash sample.
Figure 3E:
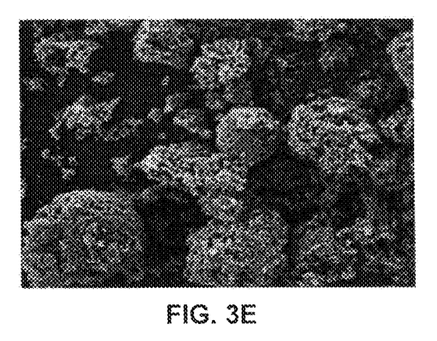
FIG. 3E is an SEM image of the surface of a $HNO_3$-functionalized treated waste oil ash sample.

The SEM images of FIGS. 3A-3E show that ash particles are composed of spheres, spheroids, and some agglomerates, and mostly are porous in nature. The size of ash particles varies from few to several microns. Similar values were also reported in previous studies [A. Mofarrah, T. Husain, C. Bottaro, Characterization of activated carbon obtained from Saudi Arabian fly ash, Int. J. Environ. Sci. Technol. (2013); C. M. López-Badillo, J. López-Cuevas, C. a. Gutiérrez-Chavarría, J. L. Rodríguez-Galicia, M. I. Pech-Canul, Synthesis and characterization of BaAl$_2$Si$_2$O$_8$ using mechanically activated precursor mixtures containing coal fly ash, J. Eur. Ceram. Soc. 33 (2013) 3287-3300—incorporated herein by reference in its entirety]. The SEM image of a raw waste oil fly ash sample (FIG. 3A) depicts the large cenospheres which are mixed with aggregates of particles. The pores are clearer and randomly located at the surface. Some pores of macro range can also be seen. After chemical treatment with the acid mixtures most of the metallic constituents are removed from the external surface and are at lower concentration inside the cenospheres, as shown in FIGS. 3B and 3C. These observations are consistent with the tabulated data obtained from EDX spot analysis (Table 4). An increase in oxygen content is due to oxidation of OFA while the percentage of sulfur is very low and all other minerals are removed. The presence of sulfur in the acid treated sample shows bonding with carbon inside the cenospheres. Some broken fly ash particles can also be seen due to the strong attack of concentrated mixture of acids. Physical activation has a significant influence on the porosity development and all the particles contain micro- and mesopores (FIG. 3C). Similar results were obtained for activated carbon prepared from coal fly ash [C. M. López-Badillo, J. López-Cuevas, C. a. Gutiérrez-Chavarría, J. L. Rodríguez-Galicia, M. I. Pech-Canul, Synthesis and characterization of BaAl$_2$Si$_2$O$_8$ using mechanically activated precursor mixtures containing coal fly ash, J. Eur. Ceram. Soc. 33 (2013) 3287-3300; Z. Lu, M. M. Maroto-Valer, H. H. Schobert, Catalytic effects of inorganic compounds on the development of surface areas of fly ash carbon during steam activation, Fuel. 89 (2010) 3436-3441—each incorporated herein by reference in its entirety]. Functionalizing the selected sample A4 with NH$_4$OH blocks some of the micropores and produces more mesopores, as shown in the FIG. 3D while the action of HNO$_3$ broke the activated carbon particles and severely affect the porosity, as can be seen in FIG. 3E and also from Table 3.

Spot analysis of selected sample was done to determine the percentage of carbon, oxygen and sulfur. Oxygen to carbon ratio shows the degree of oxidation after each activation process (Table 4). It is evident that the percentage of sulfur depends on the degree of oxidation as oxygen replaces sulfur on the surface of OFA [M. J. Khan, A. a. Al-Juhani, R. Shawabkeh, A. Ul-Hamid, I. a. Hussein, Chemical modification of waste oil fly ash for improved mechanical and thermal properties of low density polyethylene composites, J. Polym. Res. 18 (2011) 2275-2284—incorporated herein by reference in its entirety]. On the other hand, physical activation with CO$_2$ at a high temperature decreases oxygen to carbon ratio since all functional groups will leave the surface at high activation temperatures. Subsequent surface modification of selected sample #4 with either NH$_4$OH or HNO$_3$ shows different behavior against each functionalizing agent as shown in the Table 4.

The heating of AC$_{acid-CO2}$ with ammonium hydroxide increases the basicity of activated carbon by introducing nitrogen containing groups to carbon surface. In addition, post treatment of AC$_{acid-CO2}$ with HNO$_3$ leads to oxidation of carbon at the surface. The decrease in O/C ratio in AC$_{acid-CO2-NH4OH}$ in comparison with AC$_{acid-CO2}$ supports this fact. Post treatment of AC$_{acid-CO2}$ with HNO$_3$ leads to oxidation of carbon at the surface. This is confirmed by the increase of O/C ratio from 0.035 to 0.188 as shown in Table 4. FTIR studies were performed to confirm the nitrogen and acidic containing functional groups on the surface of AC$_{acid-CO2-NH4OH}$ and AC$_{acid-CO2-HNO3}$, respectively. Due to the intense oxidation conditions during HNO$_3$ functionalization, the material has experienced a higher weight loss as compared to treatment of ACacid$_{-CO2}$ with ammonium hydroxide.

Example 6

Hydrogen Sulfide Breakthrough Experiments

Figure 1:
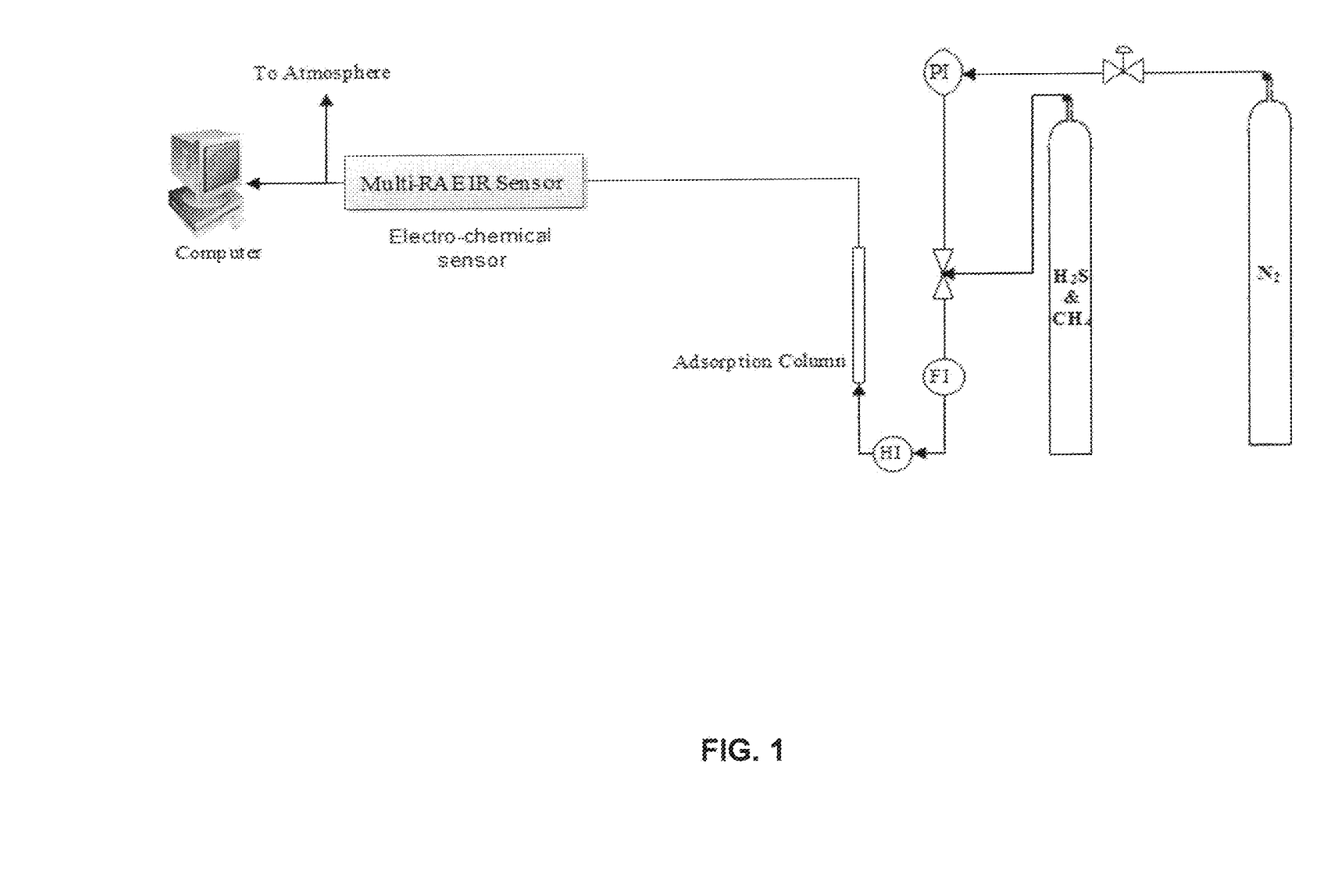
FIG. 1 is a schematic diagram of an experimental setup for $H_2S$ breakthrough adsorption/desorption measurements (PI: Pressure Indicator; FI: Flow Indicator; HI: Humidity Indicator).

An adsorption column (length=12 cm, I.D=1 cm) connected with N$_2$ and CH$_4$/H$_2$S gas cylinders, as shown in the schematic diagram of FIG. 1, was used for breakthrough adsorption/desorption experiments. The column was packed with 2.0 g treated OFA sample. Initially, the column was purged with N$_2$ at a flow rate of 0.4 L/min for 15 min. Then a gas mixture containing 50 ppm H$_2$S and CH$_4$ as balance was introduced to the column at 0.4 L/min, 20% RH at 22° C. and 1atm pressure. Exit H$_2$S concentration was continuously monitored by Multi RAE IR sensor every 2 s until reaching the saturation. Some gas samples were analyzed using GC-MS spectrophotometer to check the reliability of the gas meter.

After the completion of the adsorption cycle the valve was switched to N$_2$ at 1 atm to start the desorption cycle. The concentration of H$_2$S in the exit gas was measured continuously and stopped when the exit concentration of H$_2$S reaches zero ppm. The adsorption capacity was calculated from adsorption run using Eq. 2.

$$q = \frac{C_o \times F}{M} \int_0^{t_e} \left(1 - \frac{C}{C_o}\right) dt \qquad \text{(Eq. 2)}$$

were q=equilibrium adsorption capacity, mg/g; $t_e$=exhaust/saturation time of adsorbent; $C_o$, C=Initial and concentration at time t, respectively, mg/cm$^3$; F=gas mixture flow rate, L/min; M=mass of adsorbent, g; t=time, min.

The adsorption capacity after the desorption process was calculated using the area between adsorption and desorption curves. This capacity is the working capacity of the column. In this way we can define the regeneration efficiency (RE) of the column for the given dimension as follows:

$$RE\ (\%) = \frac{\text{Capacity after desorption}}{\text{Capacity before desorption}} \times 100\% = \frac{q_{de}}{q_{ad}} \times 100\% \qquad \text{(Eq. 3)}$$

Figure 4:
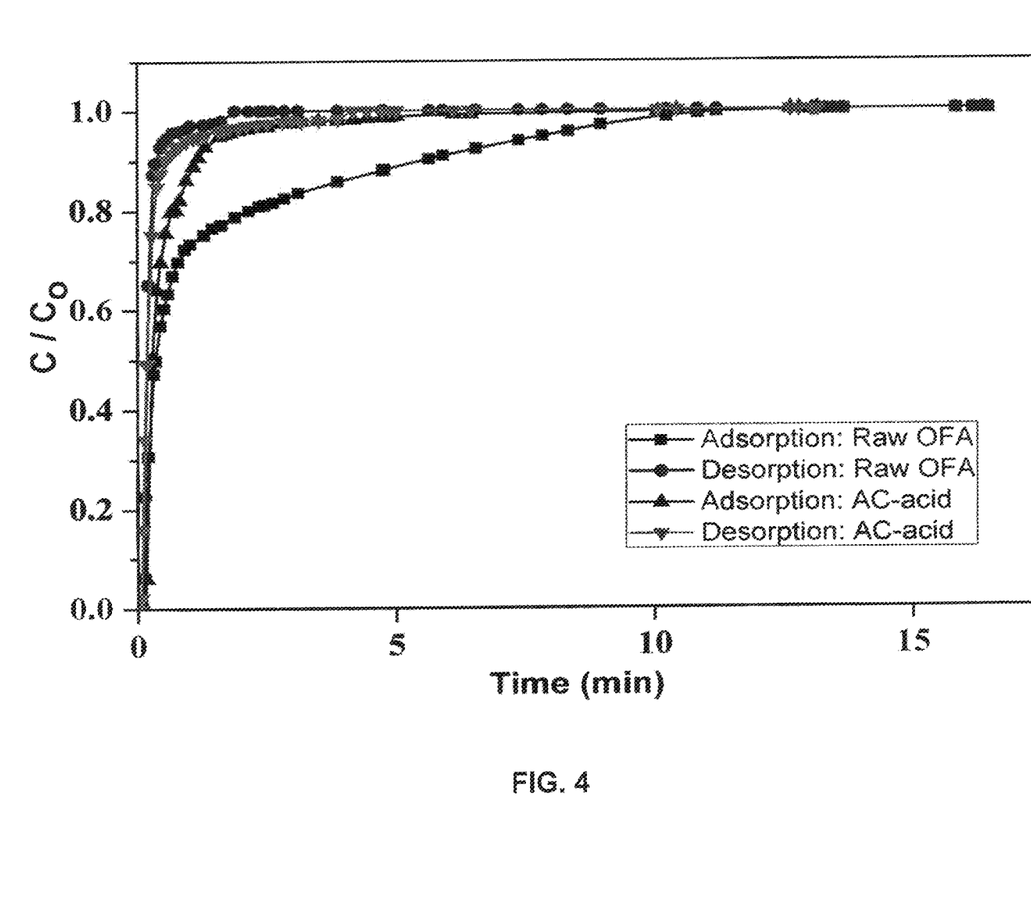
FIG. 4 shows the adsorption-desorption breakthrough curves for a raw waste oil fly ash sample and the sample after acid treatment (Pressure=1 atm, Temperature=22° C., Relative Humidity=20%, Flow rate=0.4 L/min).
Figure 5:
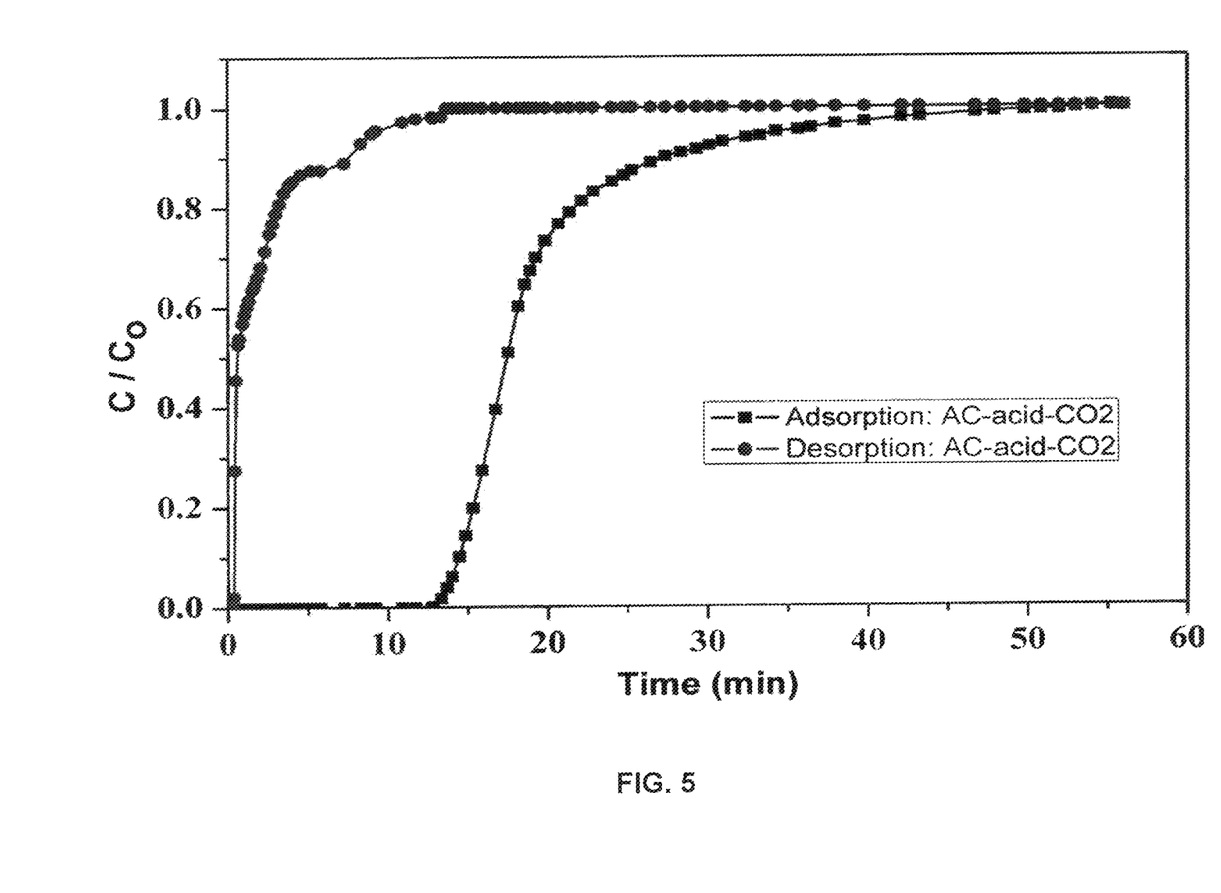
FIG. 5 shows the adsorption-desorption breakthrough curves for a raw waste oil fly ash sample after physic-chemical treatment (Pressure=1 atm, Temperature=22° C., Relative Humidity=20%, Flow rate=0.4 L/min).
Figure 6:
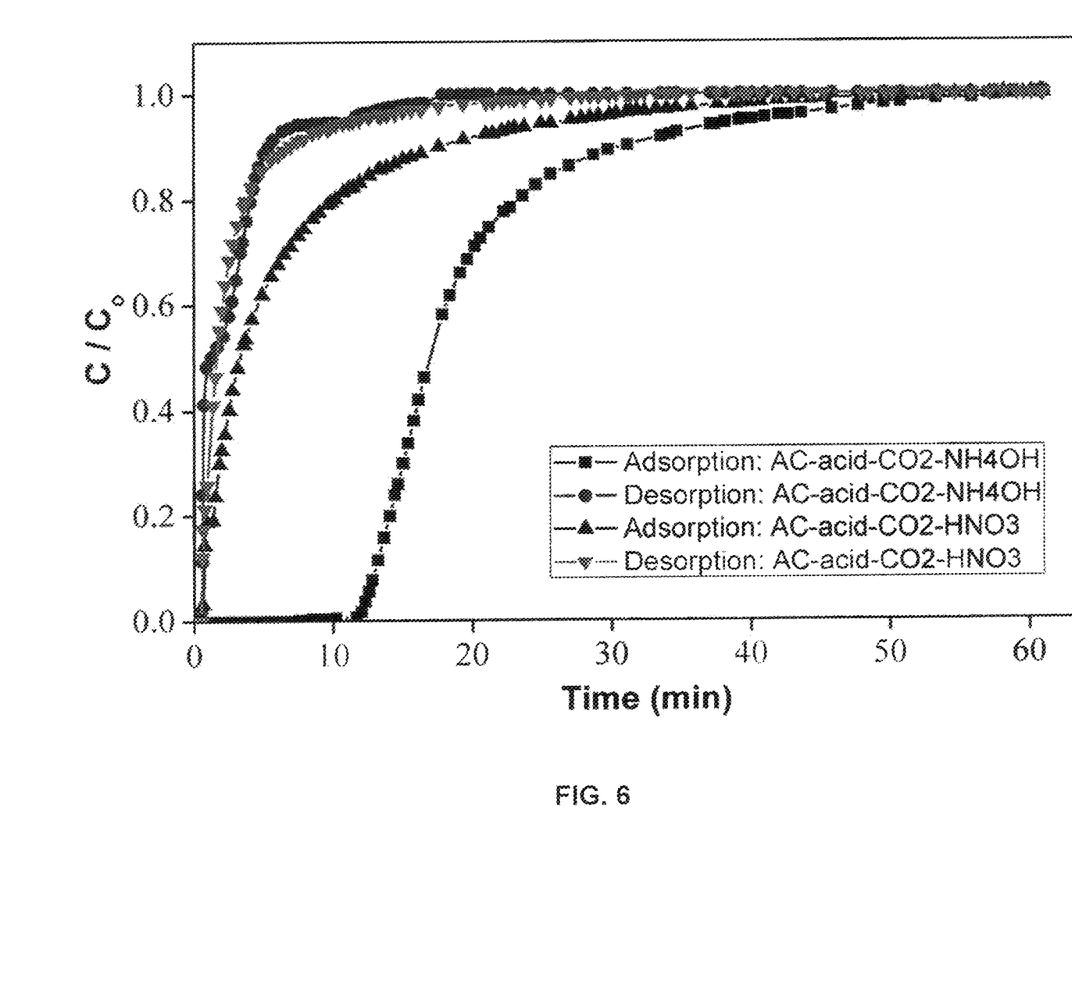
FIG. 6 shows the adsorption-desorption breakthrough curves of physic-chemically treated waste oil fly ash after functionalization with $HNO_3$ and $NH_4OH$ (Pressure=1 atm, Temperature=22° C., Relative Humidity=20%, Flow rate=0.4 L/min).

Small pore size, large surface area and basic surface functional groups play an important role in the adsorption of acidic gas molecules [R. T. Yang, Adsorbents: Fundamentals and applications, John Wiley & Sons, Inc., New Jersey, 2003—incorporated herein by reference in its entirety]. FIGS. 4-6 show the breakthrough curves of columns packed with different AC adsorbents. The adsorbents were produced through different physicochemical activations and surface modifications of OFA. Breakthrough times and equilibrium capacities of raw and activated OFA samples were calculated and the results are given in Table 5. OFA activated with the mixture of three acids and raw OFA show approximately the same (very short) breakthrough times (Table 5), but the adsorption and desorption curves are quite different from each other as shown in FIG. 4. It is expected that H$_2$S is strongly attached to raw OFA surface due to the strong host/guest attractions in the presence of mineral matter.

However, after acid treatment of raw OFA sample, the surface is oxidized through formation of acidic carbonyl functional groups. The oxidized surface would likely give a rise to repulsive surface forces relative to $H_2S$. Hence, the tendency of the adsorption-desorption process would be almost physical for $AC_{acid}$ compared to raw OFA sample (FIG. 4). The $H_2S$ breakthrough test with $AC_{acid-CO2}$ shows that the adsorbed amount of $H_2S$ has increased (FIG. 6). The same figure also shows desorption curve. The desorbed amount can be viewed as physically attached to the surface of OFA during the adsorption step, while retained amount can be considered as chemically adsorbed. According to BET analysis shown in the previous section, the surface area, micro pore volume and total basicity increases and all acid groups vanished at higher temperature during $CO_2$ activation. The decrease in the desorbed amount can be explained on the basis of the Dubinin theory of micropore filling theory. The theory which states that pores of smaller diameter will adsorb more solute at lower concentration because of higher adsorption potential exerted by the walls [W. Feng, S. Kwon, E. Borguet, R. Vidic, Adsorption of hydrogen sulfide onto activated carbon fibers: Effect of pore structure and surface chemistry., Environ. Sci. Technol. 39 (2005) 9744-9—incorporated herein by reference in its entirety].

FIG. 7 shows the $H_2S$ breakthrough results for $NH_4OH$ and $HNO_3$ treated $AC_{acid-CO2}$ samples. Ammonium hydroxide treatment of previously developed activated carbon, i.e. $AC_{acid-CO2}$ gives almost the same result as $AC_{acid-CO2}$, although the surface area is reduced for $AC_{acid-CO2-NH4OH}$ sample. This can be attributed to the nitrogen functionalities attached to the surface of carbon. As compared to $NH_4OH$ treatment, $HNO_3$ treatment again increases the oxidation of the surface, which in turn reduces the equilibrium capacity of $H_2S$. More acidic surface of adsorbent inhibits the dissociation of $H_2S$, hence decreases the concentration of hydrogen sulfide ions. Low concentration of these ions promotes the formation of high-valent sulfur compounds like $SO_2$ and sulfuric acid which leads to low $H_2S$ removal capacity. On the other hand, adsorbent surface with pH in the basic range favors the dissociation of $H_2S$ to hydrogen sulfide ions, i.e., $HS^-$. These ions are oxidized to form sulfur polymers having ring or chain like shape yielding higher $H_2S$ removal capacities [W. Feng, S. Kwon, E. Borguet, R. Vidic, Adsorption of hydrogen sulfide onto activated carbon fibers: Effect of pore structure and surface chemistry., Environ. Sci. Technol. 39 (2005) 9744-9; M. Abe, K. Kawashima, K. Kozawa, H. Sakai, K. Kaneko, Amination of activated carbon and adsorption characteristics of Its aminated surface, Langmuir. 16 (2000) 5059-5063; F. Adib, A. Bagreev, T. J. Bandosz, Adsorption/Oxidation of hydrogen sulfide on nitrogen-containing activated carbons, Langmuir. 16 (2000) 1980-1986; T. J. Bandosz, On the adsorption/oxidation of hydrogen sulfide on activated carbons at ambient temperatures., J. Colloid Interface Sci. 246 (2002) 1-20—each incorporated herein by reference in its entirety].

Regeneration efficiency was calculated for different AC samples using Eq. 3 and the results are given in Table 5. It is essential to effectively regenerate loaded adsorbent in industrial applications (such as pressure swing adsorption) for economic feasibility of the process. Regeneration efficiency is an indicator of reusability of any sorbent. Table 5 shows that regeneration efficiency of raw OFA sample is ~83%. Both the equilibrium capacity and regeneration efficiency of $AC_{acid}$ are the lowest compared to all other samples. The reason behind this observation is already mentioned that this sample possess repulsive functional groups on its surface. However, activation of this sample by $CO_2$ at high temperature increases both the capacity and regeneration efficiency, which can lead to a potential commercial application.

TABLE 5

Equilibrium capacity and breakthrough time of hydrogen sulfide after adsorption tests.

| Sample type | Equilibrium capacity (mg/g) | Adsorption capacity left after desorption (mg/g) | Regeneration efficiency (%) | Break Through Time (sec) |
|---|---|---|---|---|
| Raw OFA | 0.0231 | 0.0192 | 83.41 | 6 |
| $AC_{acid}$ | 0.0088 | 0.0036 | 40.96 | 8 |
| $AC_{acid-CO2}$ | 0.2966 | 0.2639 | 89.00 | 770 |
| $AC_{acid-CO2-NH4OH}$ | 0.3001 | 0.2594 | 86.43 | 450 |
| $AC_{acid-CO2-HNO3}$ | 0.1035 | 0.0573 | 55.34 | 36 |

Example 7

Comparisons with the Prior Art

The detailed differences between the present disclosure and the pertinent prior art are given in Table 6. Specifically, the differences in the final surface area obtained for each modification and the adsorption capacity are summarized in Table 6. All references cited in Table 6 are incorporated herein by reference in their entireties.

TABLE 6

Comparisons of various activated carbon from the prior art with the present disclosure.

| Adsorbent | Modification | Conclusions | Reference |
|---|---|---|---|
| Commercial coconut-based activated carbon | i. Impregnation with strong base (NaOH) and an oxidant (HCl); ii. 2 concentrations of $H_2S$ (10 ppm and 1000 ppm) were examined. | i. Adsorption depends on the basic functional groups on the surface of carbon. ii. Moisture content in $H_2S$ or on the surface of the adsorbent enhances adsorption capacity. | Y. Elsayed, M. Seredych, A. Dallas, T. J. Bandosz, Desulfurization of air at high and low $H_2S$ concentrations, Chem. Eng. J. 155 (2009) 594-602. |
| Coconut-based activated carbon | i. Impregnation with 3 types of alkaline solutions (NaOH, KOH, $K_2CO_3$) at different ratios; ii. Sorption tests were performed using simulated | i. Carbon impregnated with $K_2CO_3$ exhibited highest adsorption capacity. ii. As the concentration of $H_2S$ increases, the | H. S. Choo, L. C. Lau, A. R. Mohamed, K. T. Lee, Hydrogen sulfide adsorption by |

TABLE 6-continued

Comparisons of various activated carbon from the prior art with the present disclosure.

| Adsorbent | Modification | Conclusions | Reference |
| --- | --- | --- | --- |
| | biogas prepared by mixing $CH_4$, $CO_2$ and $H_2S$, i.e. 50% $CO_2$ with varying concentrations of $H_2S$ (1000-5000 ppm and the balanace is $CH_4$. | adsorption capacity of the activated carbon decreases. | alkaline impregnated coconut shell activated carbon, J. Eng. Sci. Technol. 8 (2013) 741-753. |
| Bituminous coal-based activated carbon | i. Coal was first oxidized with air and then pyrolized under $N_2$ and $CO_2$ flow. Pyrolized sample was further oxidized with 50% $HNO_3$ for 4 h and then washed with water. Oxidized samples were divided into two portions, i.e. one portion was treated with melamine suspension while the other was treated with a melamine-urea suspension followed by heat treatment at 850° C.<br>ii. Moist air stream containing 0.3% (3000 ppm) $H_2S$ was used in adsorption experiments. | Modifications of bituminous coal-based activated carbon with $N_2$-containing species increases the $H_2S$ adsorption capacity than unmodified carbon. | A. Bagreev, J. Angel Menendez, I. Dukhno, Y. Tarasenko, T. J. Bandosz, Bituminous coal-based activated carbons modified with nitrogen as adsorbents of hydrogen sulfide, Carbon. 42 (2004) 469-476. |
| Activated carbon fibers (ACFs) manufactured by polymerization of phenol and formaldehyde | i. Different schemes were used to modify the surface of carbon and 3 adsorbents were prepared by drying samples under $N_2$ flow at 140° C. for 2 h followed by heating under $N_2$ at 900° C. for 4-6 h and then cooled to room temperature. Also, samples were dried under $N_2$ and then oxidized with $O_2$ at 200° C. for 2 h.<br>ii. $N_2$ gas stream carrying 200 ppm $H_2S$ was used in adsorption tests | ACFs with higher surface area gave high adsorption capacity and retention of sulfur which further enhances with heat treatment of carbon. | W. Feng, S. Kwon, E. Borguet, R. Vidic, Adsorption of hydrogen sulfide onto activated carbon fibers: Effect of pore structure and surface chemistry., Environ. Sci. Technol. 39 (2005) 9744-9. |
| Activated carbon made from different raw materials (Bituminous coal, coconut shell, wood and peat) | i. Carbon samples were washed to remove water-soluble impurities and dried at 120° C.<br>ii. Samples were oxidized with 15M $HNO_3$ with a ratio of 5 ml acid to 1 g of carbon.<br>iii. After oxidation, one portion of the sample was set aside while the other portion was further treated with ammonium persulfate solution.<br>iv. $N_2$ gas stream carrying 3000 ppm $H_2S$ was used in adsorption tests. | Acidic environment promotes the formation of sulfur oxide and sulfuric acid while the basic environment promotes the formation of elemental sulfur. | F. Adib, A. Bagreev, T. J. Bandosz, Adsorption/Oxidation of hydrogen sulfide on nitrogen-containing activated carbons, Langmuir. 16 (2000) 1980-1986. |
| Waste oil fly ash (OFA) was used. OFA with carbon content of more than 80% and the rest is mainly metal oxides and sulfur. | Treatment with a mixture of sulfuric, nitric and phosphoric acids followed by thermal treatment with $CO_2$ at high temperatures up to 990° C., then treatment with ammonium hydroxide. | High surface area and high adsorption capacity were obtained. | The present disclosure. |

The invention claimed is:

1. A process for preparing an activated carbon material, comprising:
   refluxing a waste oil fly ash powder with a first acid solution to form a solid residue; and
   heating the solid residue at 900-1050° C. and purging the solid residue in a flow of carbon dioxide to form the activated carbon material.

2. The process of claim 1, wherein the first acid solution comprises one or more acids selected from the group consisting of sulfuric acid, nitric acid and phosphoric acid.

3. The process of claim 2, wherein the first acid solution comprises two acids at a volume ratio of 1-13:1-13.

4. The process of claim 2, wherein the first acid solution comprises three acids at a volume ratio of 1-8.5:1-8.5:1-8.5.

5. The process of claim 1, wherein the refluxing is carried at 100-150° C. for 3-6 h and at a concentration of 10-100 g of the waste oil fly ash powder per liter of the first acid solution.

6. The process of claim 1, wherein the heating is carried out for 30-90 min.

7. The process of claim 1, wherein the purging is carried out for 15-45 min, at 1-5 bar and at a carbon dioxide flow rate of 0.5-2.0 L/min.

8. The process of claim 1, wherein during the purging, the solid residue is not chemically modified.

9. The process of claim 1, wherein the solid residue has a pH value of 5.5-7.5.

10. The process of claim 1, further comprising:
    contacting and refluxing the activated carbon material with a second acid solution or an ammonia solution to attach carboxylic groups or amine groups onto the surface of the activated carbon material.

11. The process of claim 10, wherein the second acid solution is a nitric acid solution.

12. The process of claim 10, wherein the contacting and the refluxing are carried out at 80-120° C. for 3-6 h and at a concentration of 50-200 g of the activated carbon material per liter of the second acid solution or the ammonia solution.

13. The process of claim 1, wherein the refluxing, the heating and the purging increase the BET surface area of the activated carbon material, increase the total pore volume of the activated carbon material and reduce the average pore size of the activated carbon material.

14. An activated carbon material prepared by the process of claim 1, wherein the activated carbon material has a BET surface area of 30-400 $m^2/g$, a total pore volume of 0.25-0.50 $cm^3/g$ and an average pore size of 40-100 Å.

15. A method for removing hydrogen sulfide from a gaseous stream, comprising:
    contacting the gaseous stream with the activated carbon material of claim 14.

16. The method of claim 15, wherein the gaseous stream is a natural gas stream.

17. The method of claim 15, wherein the activated carbon material has a concentration of 0.01-0.05 g per ppm of the hydrogen sulfide present in the gaseous stream.

18. The method of claim 15, wherein the activated carbon material is affixed to a packed bed of an adsorption column and the gaseous stream is passed through the packed bed at 0.1-1.0 L/min at atmospheric pressure and at ambient temperature.

19. The method of claim 15, wherein the activated carbon material adsorbs the hydrogen sulfide and has a hydrogen sulfide adsorption capacity of 0.10-0.35 mg of hydrogen sulfide per gram of the activated carbon material.

20. The method of claim 15, wherein the activated carbon material has a regeneration efficiency of 40-90%.

* * * * *